United States Patent
Sapienza, IV

[11] Patent Number: 6,029,333
[45] Date of Patent: Feb. 29, 2000

[54] METHOD OF MAKING AN INSPECTION FIXTURE FOR DETERMINING THE ACCURACY OF BENT TUBULAR PARTS

[75] Inventor: Joseph Sapienza, IV, Maineville, Ohio

[73] Assignee: Ferco Tech Corporation

[21] Appl. No.: 08/984,935

[22] Filed: Dec. 4, 1997

[51] Int. Cl.[7] .............................. G01B 5/20; G01B 3/14; B21D 5/00
[52] U.S. Cl. ............... 29/407.01; 29/428; 29/407.09; 72/369; 33/551; 33/566
[58] Field of Search ...................... 29/407.01, 407.09; 72/369, 476; 33/549, 551, 562, 566; 493/395

[56] References Cited

U.S. PATENT DOCUMENTS

| | | | |
|---|---|---|---|
| 3,203,100 | 8/1965 | Hegedus | 33/534 |
| 4,689,891 | 9/1987 | Clark | 33/562 X |
| 4,739,487 | 4/1988 | Bonnet et al. | 364/474.08 |
| 4,773,284 | 9/1988 | Archer et al. | 76/4 |
| 4,893,489 | 1/1990 | Mason | 72/10.2 |
| 4,970,600 | 11/1990 | Garnier et al. | 358/299 |
| 4,999,555 | 3/1991 | Yamazaki et al. | 318/578 |
| 5,065,329 | 11/1991 | Yamazaki et al. | 364/474.08 |
| 5,208,995 | 5/1993 | McKendrick | 33/567 X |
| 5,412,877 | 5/1995 | McKendrick | 33/567 X |
| 5,453,594 | 9/1995 | Konecny | 219/121.61 |
| 5,488,470 | 1/1996 | Ooenoki | 356/138 |
| 5,537,895 | 7/1996 | Young et al. | 76/107.8 |
| 5,575,935 | 11/1996 | Nakata | 219/121.61 |
| 5,614,115 | 3/1997 | Horton et al. | 219/121.67 |

*Primary Examiner*—S. Thomas Hughes
*Assistant Examiner*—Eric Compton
*Attorney, Agent, or Firm*—Biebel & French

[57] ABSTRACT

Methods of making an inspection fixture to assess the accuracy of a manufactured, bent tube or tube assembly are disclosed. Coordinates of end points, intersection points, and other points of interest of the bent tubular part are provided to a CAD system. The coordinates are connected by a centerline. The centerline is projected onto an X-Y plane and widened. The projected centerline is extruded in the Z direction. The resulting three-dimensional extrusion is unfolded to form a flat pattern for a tube run. The process is repeated until flat patterns for the parts of a tube fixture are created. The resulting flat patterns are provided to a computer-controlled laser cutting machine. The inspection fixture parts are cut by the laser cutting machine and bent to their final shape in accordance with bend angle information generated from the three-dimensional extrusion in the CAD system. The bent parts are assembled on a base plate and welded together to form the inspection fixture.

7 Claims, 14 Drawing Sheets

METHOD OF MAKING AN INSPECTION FIXTURE FOR DETERMINING THE ACCURACY OF BENT TUBULAR PARTS

BACKGROUND OF THE INVENTION

The present invention relates to a method of making an inspection fixture for determining the accuracy of bent tubular parts.

In many industries, and in the aerospace industry in particular, products and machines often require bent tubular parts. Bent tubular parts usually take the form of conduits or pipes that carry gases or other fluids or serve as mounting harnesses for turbine engines and the like. Typically, the conduit or pipe starts out as a straight tube, and is bent into the required shape.

In most applications, the bent tubular parts are required to conform to precise dimensional specifications. One method of determining whether a bent tubular part conforms to the required dimensional tolerances is to construct an inspection fixture having the same profile and dimensional tolerances as an accurately conformed bent tubular part. The bent tubular part to be checked is placed on the fixture. If the bent tubular part can be congruently mounted over the fixture, then the bent tubular part conforms to the required tolerances. If the bent tubular part does not conform to the profile and dimensions of the fixture, then the bent tubular part is rejected as unsuitable.

Prior art inspection fixtures are typically made of blocks of wood or aluminum. Typically, the fixture maker starts with a set of engineering drawings of the desired bent tubular part. He then determines a suitable orientation for the bent tubular part and then typically cuts or forms a series of blocks from wood or aluminum that have flat bottoms, stand vertically upright, and have top surfaces that have profiles that match the shape of respective straight line segments of the bent tubular part. The fixture maker then cuts the end surfaces of the blocks at angles so that the blocks may be angularly fitted together in end-to-end relationship to provide a mounting surface for determining the conformational and dimensional accuracy of the manufactured bent tubular part superposed thereon.

The fitting of the blocks in end-to-end angular relationship defines the profile of the fixture in the X-Y plane when viewed from above. The top surfaces of the blocks will then be cut so as to form the necessary profiles to accommodate features of the bent tubular part such as fittings, couplings, wear sleeves and nuts. The vertical height of the blocks defines the profile of the fixture in the Z dimension. It matches the Z dimension coordinates of an accurately made tube part. The blocks may also be cut to allow for the attachment of yokes and locating means such as end blocks. The blocks are then typically affixed to a base.

The prior art method of making a fixture for determining the accuracy of bent tubular parts may take weeks to prepare. Also, the fixture maker must typically be a skilled machinist or model maker. Accordingly, there continues to exist a need for a method of quickly making an inspection fixture for determining the accuracy of bent tubular parts.

SUMMARY OF THE INVENTION

The present invention provides a method of making an inspection fixture for determining the accuracy of a bent tubular part wherein the method includes the steps of creating a first flat pattern for making a tube run, creating a second flat pattern for making a base plate, and creating additional flat patterns as necessary for making additional tube runs and support gussets.

The first flat pattern comprises a multiplicity of height dimensions spaced along its length that may be referred to as conformational information points. These correspond to the desired Z or height dimensions of the inspection fixture. On the other hand, the second flat pattern contains a multiplicity of X and Y conformational information points corresponding to the desired length and width dimensions (i.e., X and Y directions) of the inspection fixture.

After the flat patterns have been created, the tube run is formed from a rigid sheet material and dimensionally corresponds to the first flat pattern. Then, the base plate is formed from sheet material and corresponds to the second flat pattern. Likewise, the additional tube runs and gussets are formed from the sheet material to match their respective flat patterns.

After the tube run has been formed from the sheet material, it is shaped by bending such that a top edge of the tube run (hereinafter the track) defines a profile to which an accurately bent tubular part conforms when the tubular part is dimensioned within predetermined specifications. Stated differently, the manufactured tube part will be assessed for dimensional and conformational accuracy by placing it over the track. If the part congruently matches the track, it will be deemed to be dimensionally and conformationally accurate.

Additional tube runs, if needed, are shaped by bending if necessary. The shaped first tube run, additional tube runs, and gussets are attached to the base plate by any suitable means, such as welding.

The flat patterns may be created by providing the X, Y, Z conformational information points (or coordinates) of the bent tubular part to a computer-aided-design/computer-aided-manufacturing (CAD/CAM) software program. These points are then used to generate three-dimensional images having a top edge profile that conforms to the shape of the bent tubular part in three-dimensional space. The images are then unfolded or flattened to create the flat patterns.

The first tube run, the base plate, the additional tube runs, and gussets may be formed by providing flat patterns from the CAD/CAM software program as input to a computer-controlled laser cutting machine. The laser cutter then cuts the required parts from a suitable sheet material so as to dimensionally correspond to the flat patterns. One exemplary software program for controlling a laser cutter is the Sigma Nest software program. The first tube run and additional tube runs, if needed, are then bent to their final shapes in a standard bending press.

The invention will be further described in the following description, the accompanying drawings and the appended claims.

DETAILED DESCRIPTION OF THE PREFERRED EMBODIMENT

A typical bent tubular part 10 may be seen in FIGS. 1–4. The bent tubular part 10 may include a first or primary tube segment 12, and secondary or auxiliary tube segments 14, 16. In addition, the bent tubular part 10 may include couplings 18, fittings, mounting brackets 20, T-connectors 22, nuts 24 and other assorted hardware. The tube segments 12, 14, 16 may be composed of a plurality of straight-line segments of tube material bent at an angle with respect to each other. The bends may have bend radii such that they form arcuate connecting segments between the straight-line segments.

For each of the straightline tube segments there may be defined a centerline running longitudinally through a central axis of the segments. Further, there may be defined end points located on the centerlines at the ends of the tube segments. Also, there may be defined intersection points lying at the junction of adjacent straight-line segment centerlines. In addition, locating points for various features of interest may also be defined. All of these points may be collectively referred to as conformational information points. These conformational information points correspond to the X, Y, and Z coordinates given along the length of the tube that, together, define the true 3D conformation of the bent tube.

Figure 1:
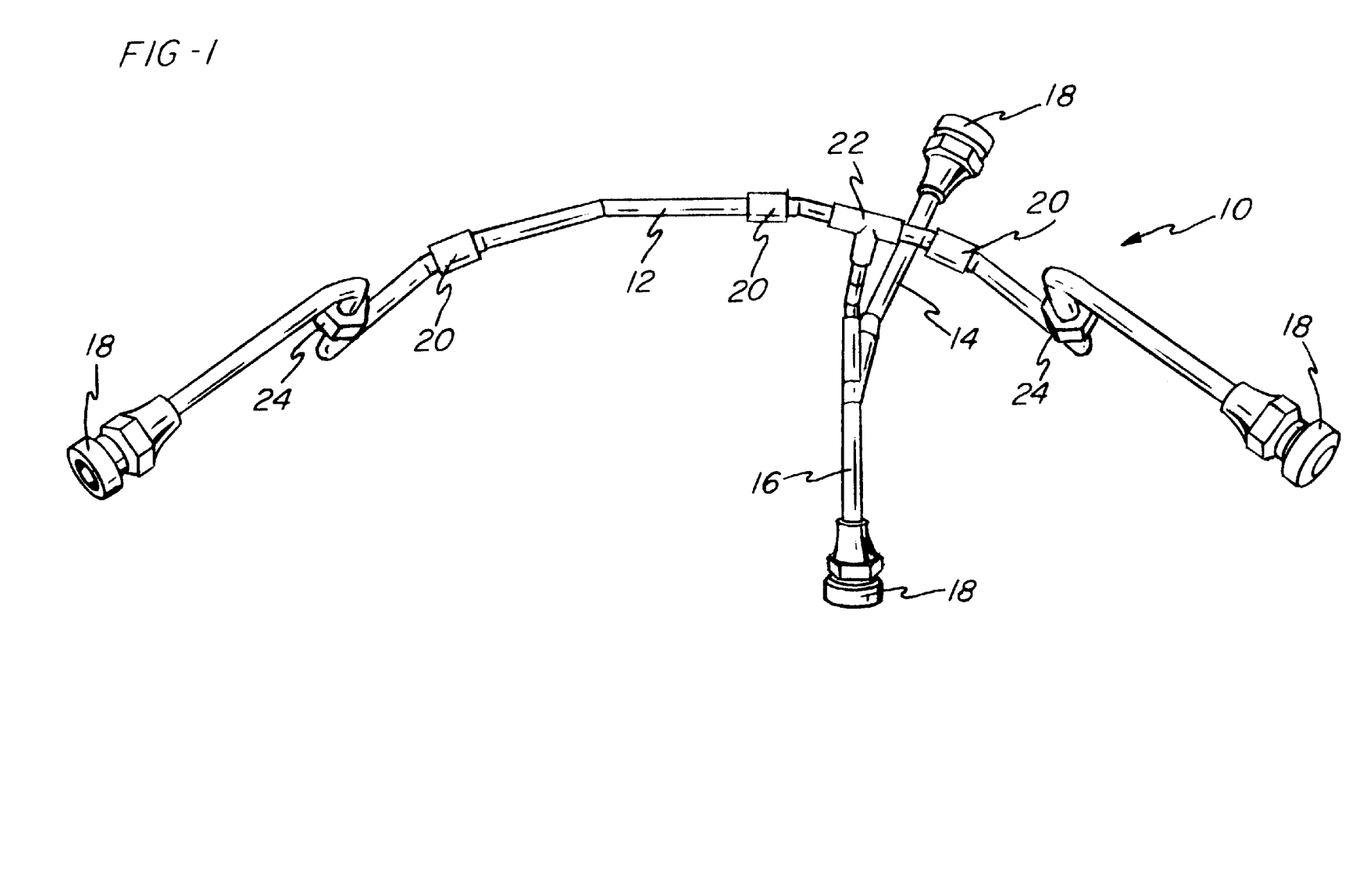
FIG. 1 is a front elevational view of a bent tubular part, the accuracy of which is to be determined by an inspection fixture made in accordance with the method of the invention.
Figure 2:
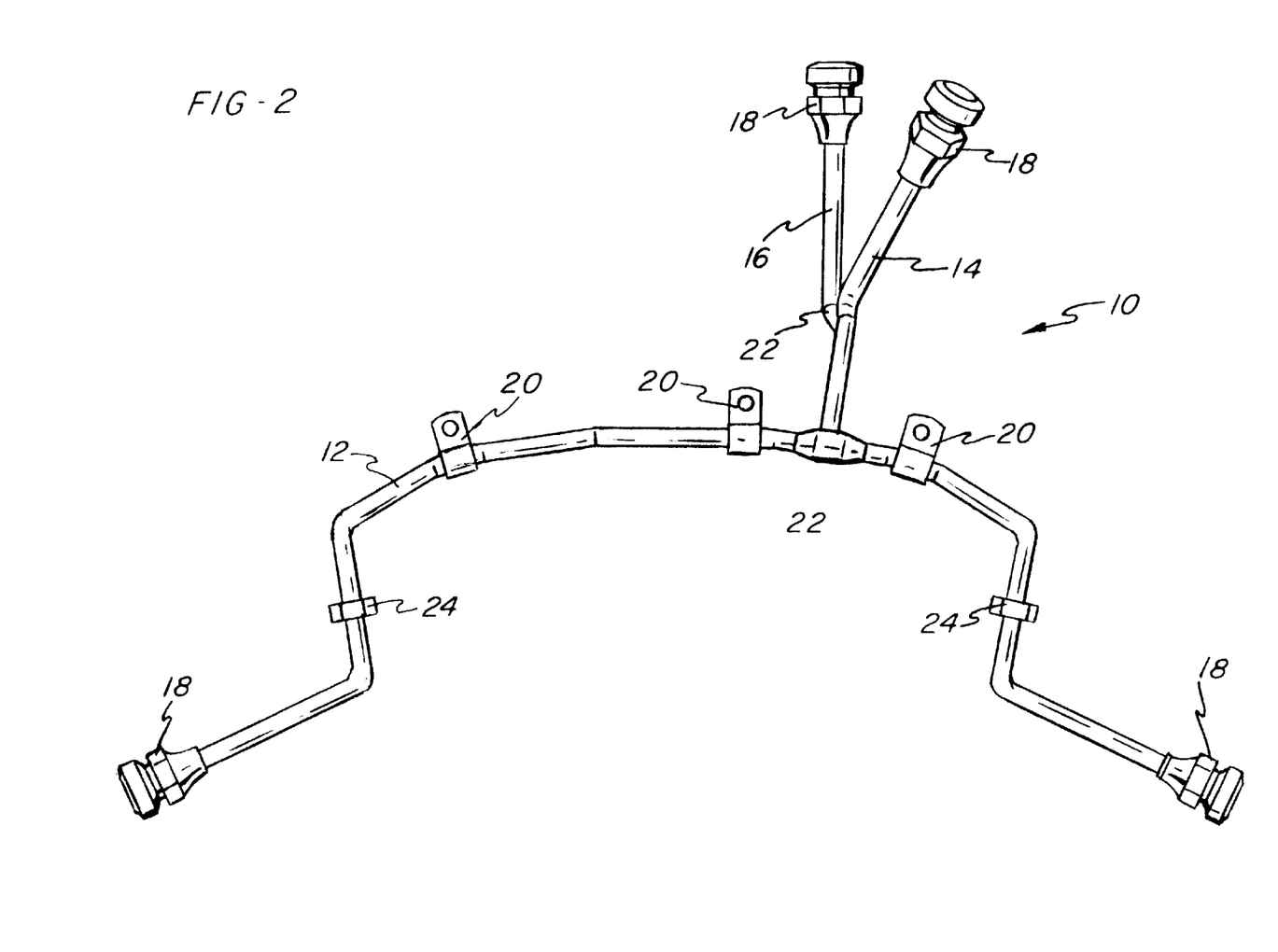
FIG. 2 is a top plan view of the bent tubular part of FIG. 1.
Figure 3:
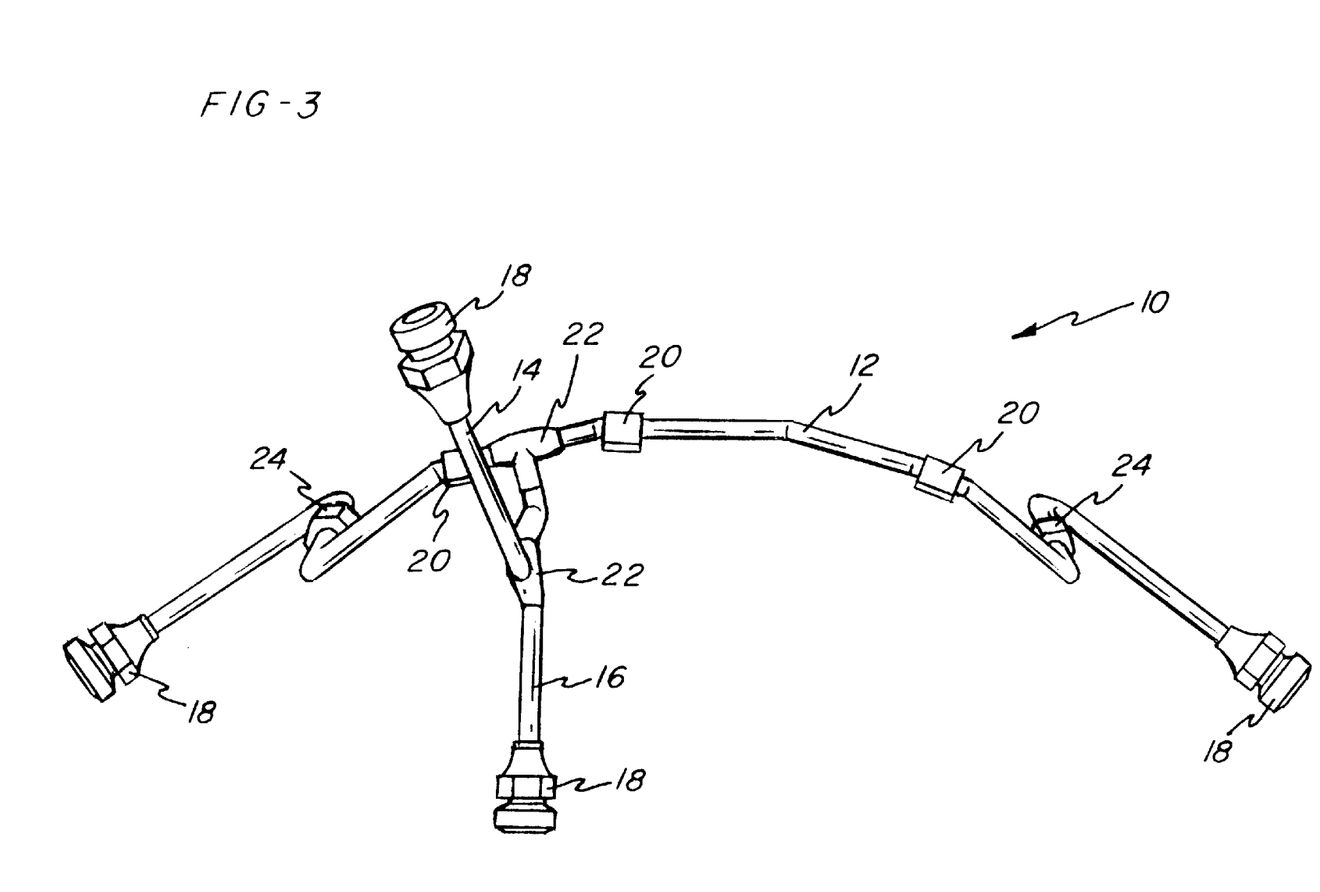
FIG. 3 is a rear elevational view of the bent tubular part of FIG. 1.
Figure 4:
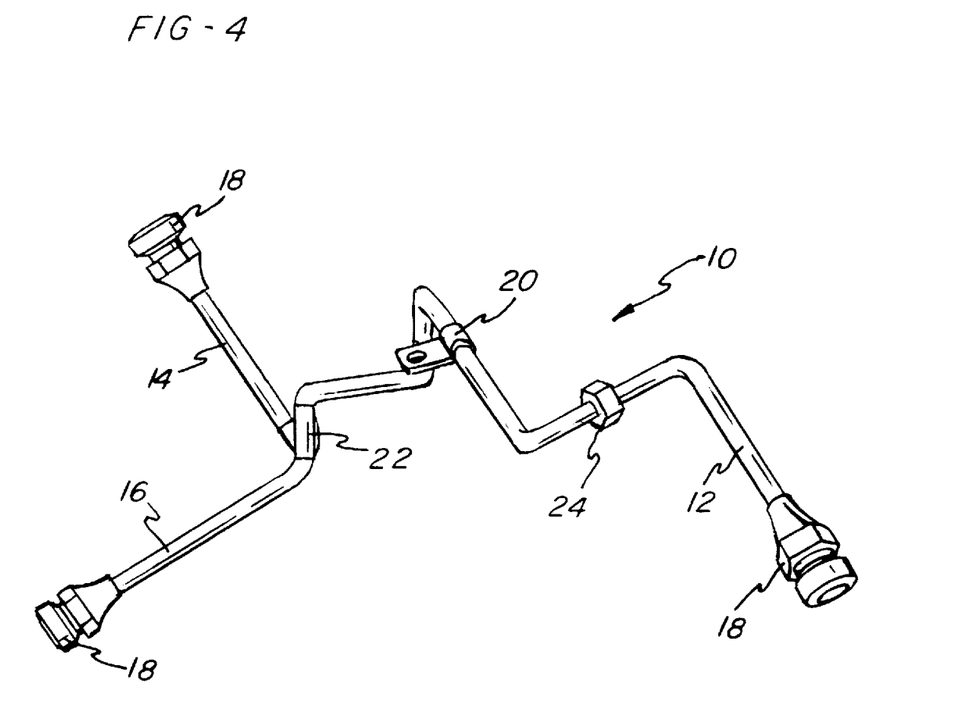
FIG. 4 is a left side elevational view of the bent tubular part of FIG. 1.
Figure 5:
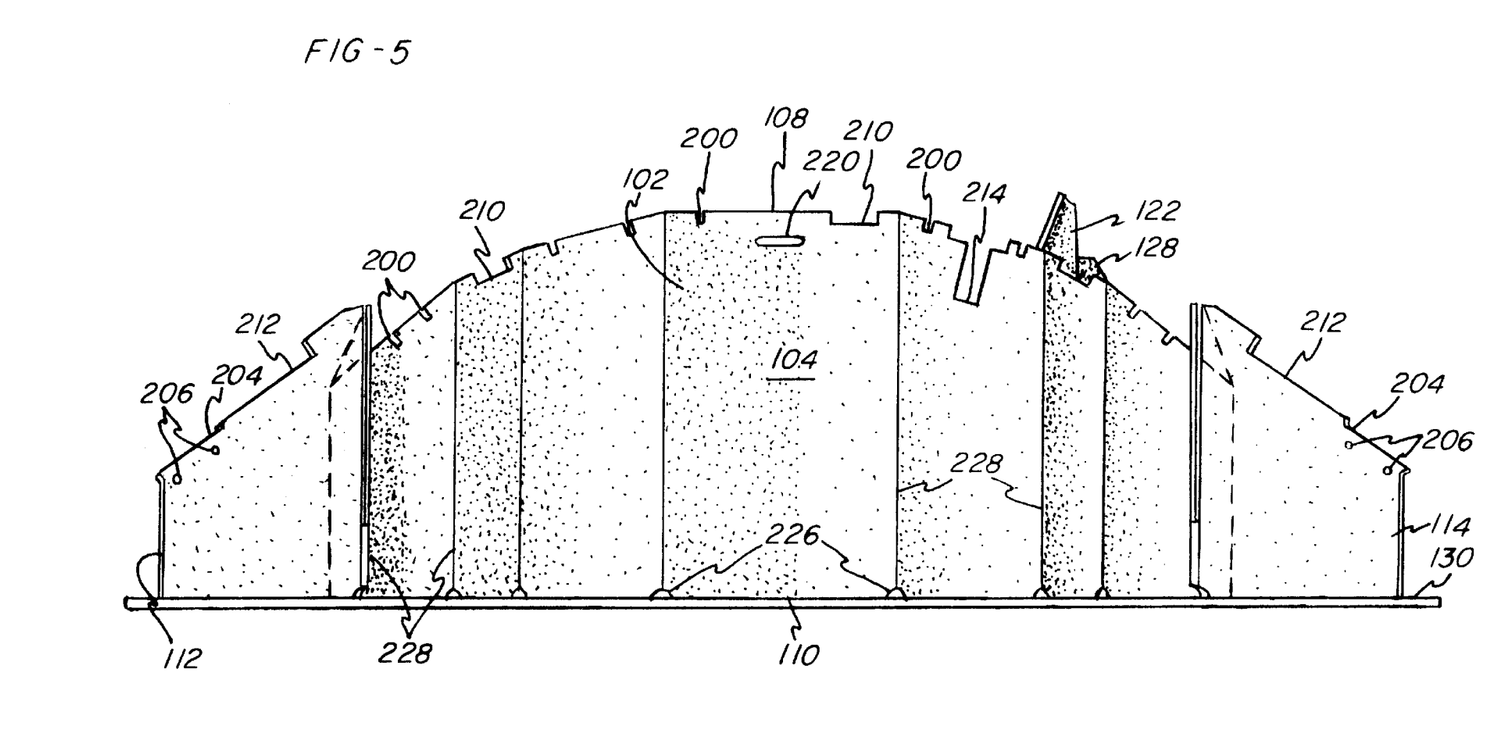
FIG. 5 is a front elevational view of a tube inspection fixture made in accordance with the method of the invention.
Figure 6:
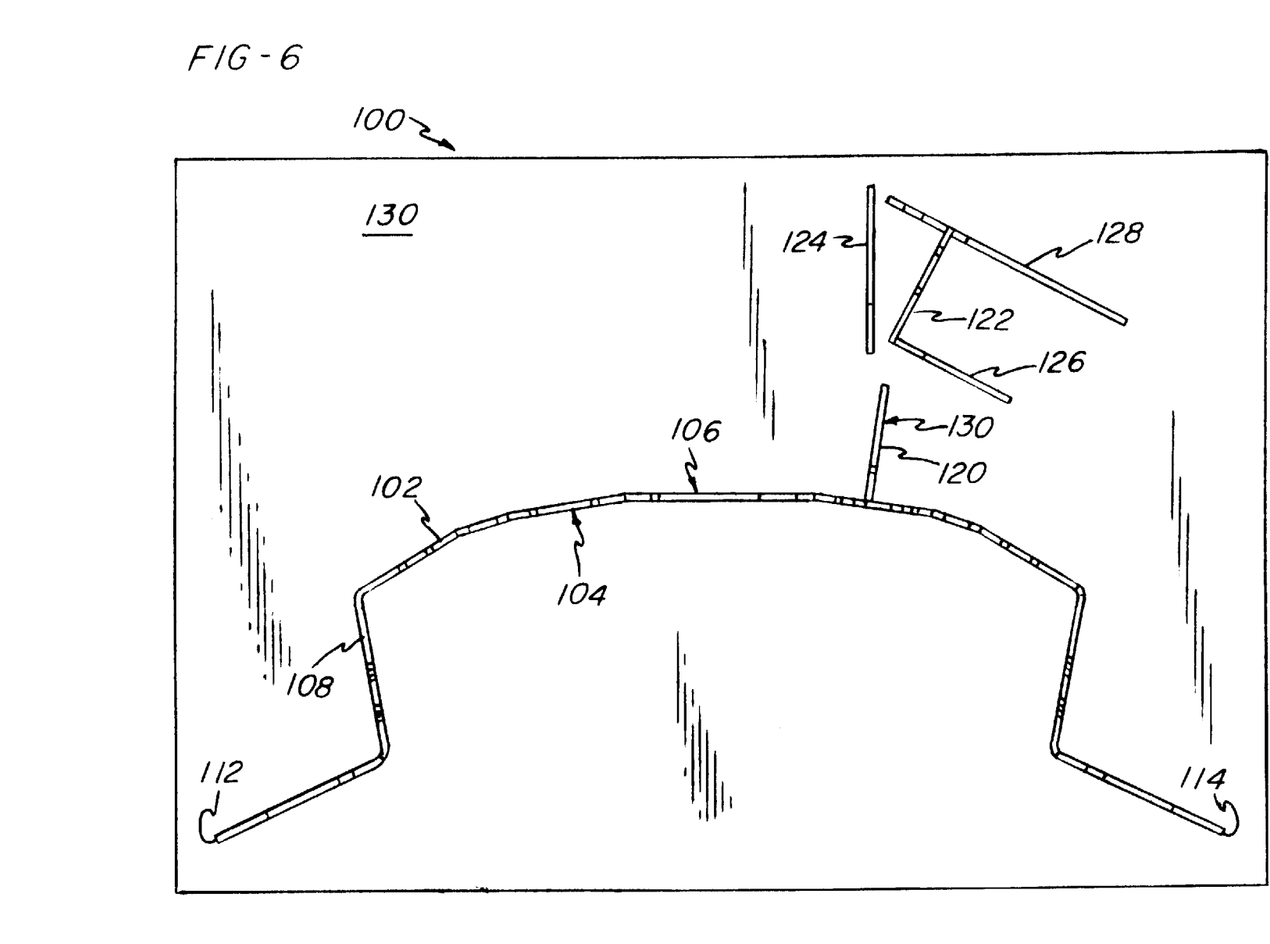
FIG. 6 is a top plan view of the inspection fixture of FIG. 5.
Figure 7:
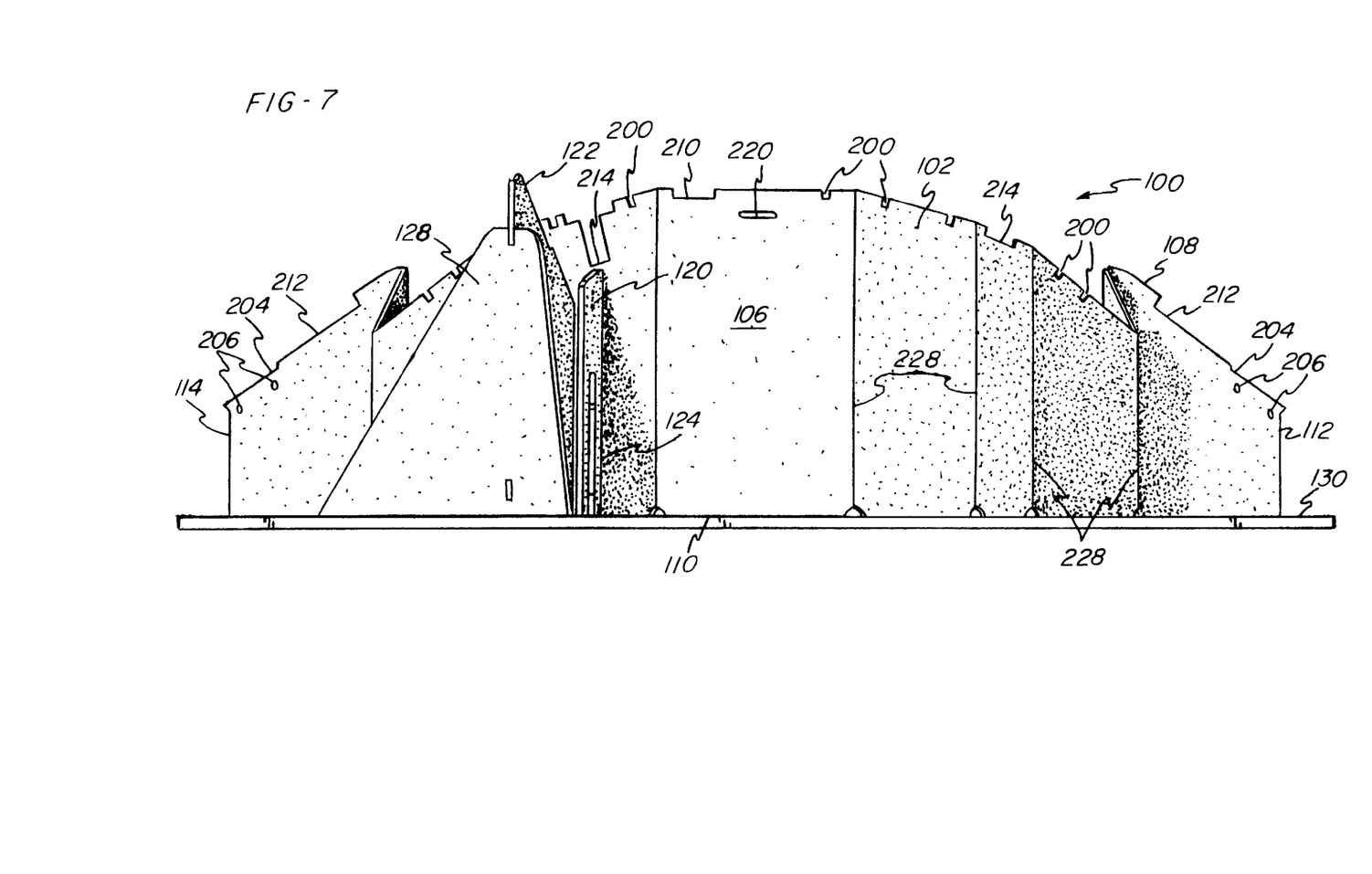
FIG. 7 is a rear elevational view of the inspection fixture of FIG. 5.
Figure 8:
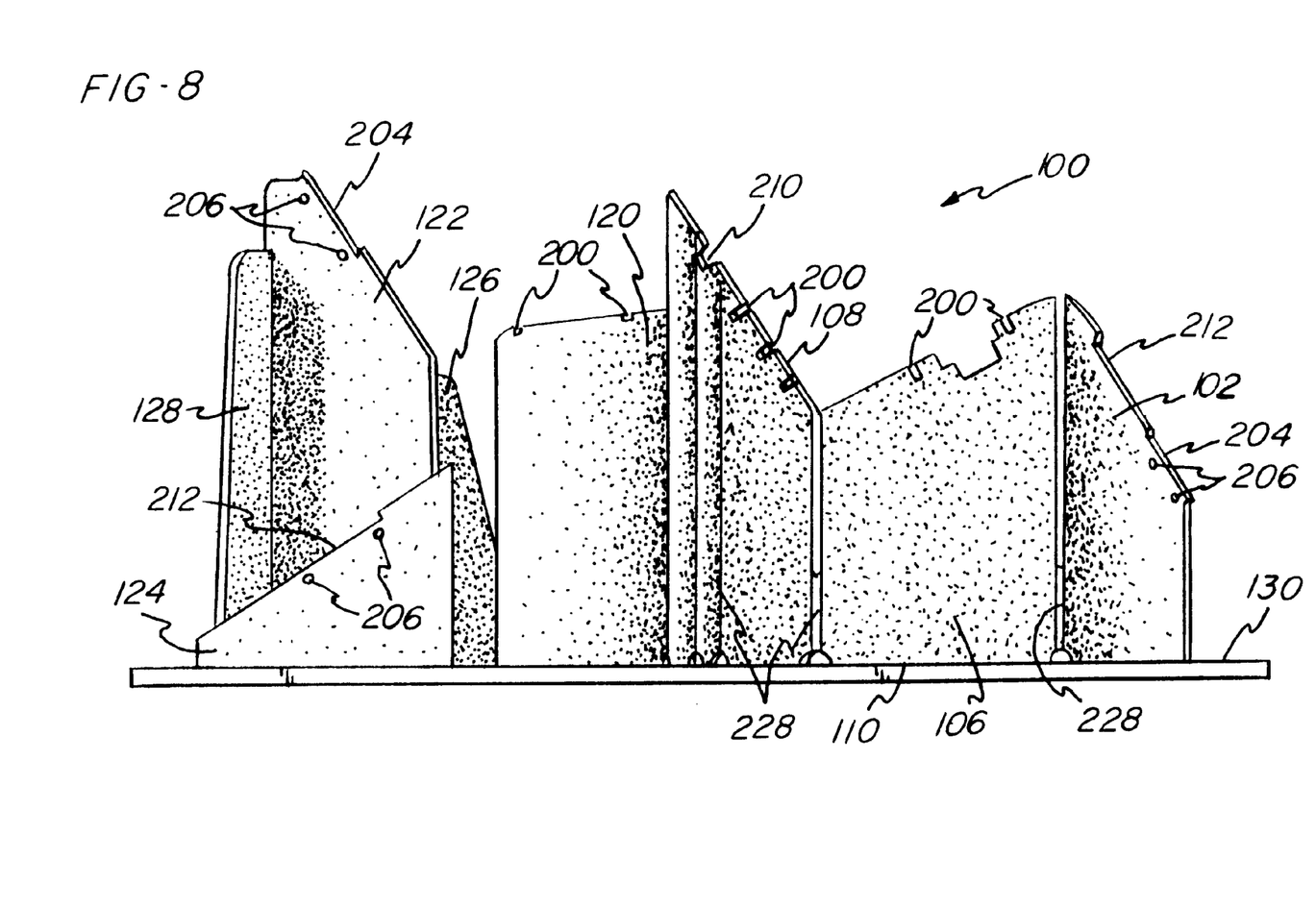
FIG. 8 is a left side elevational view of the inspection fixture of FIG. 5.
Figure 9:
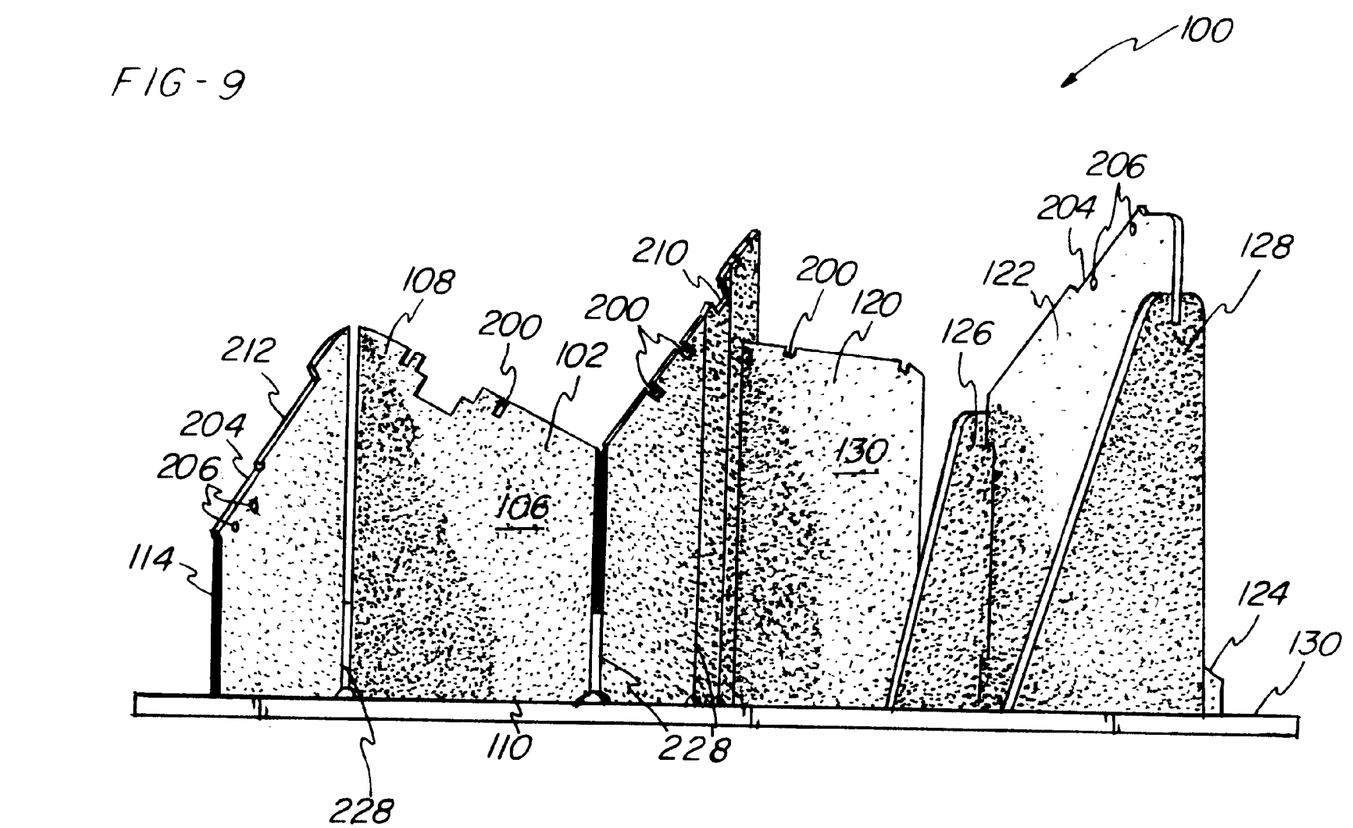
FIG. 9 is a right side elevational view of the inspection fixture of FIG. 5.

Referring to FIGS. 5–11, a tube inspection fixture 100 made in accordance with the method of the present invention includes a first or primary tube run 102 having a front surface 104, a rear surface 106, a top edge or track 108, a bottom edge 110, a left edge 112, and a right edge 114. As shown in FIG. 6, the fixture 100 also includes a second tube run 120, a third tube run 122, a fourth tube run 124, a first support gusset 126, and a second support gusset 128, each having a front surface, a rear surface, a top edge, a bottom edge, a left edge, and a right edge, respectively. The tube runs 102, 120, 122, 124 and the support gussets 126, 128 are mounted on a base plate 130.

Figure 10:
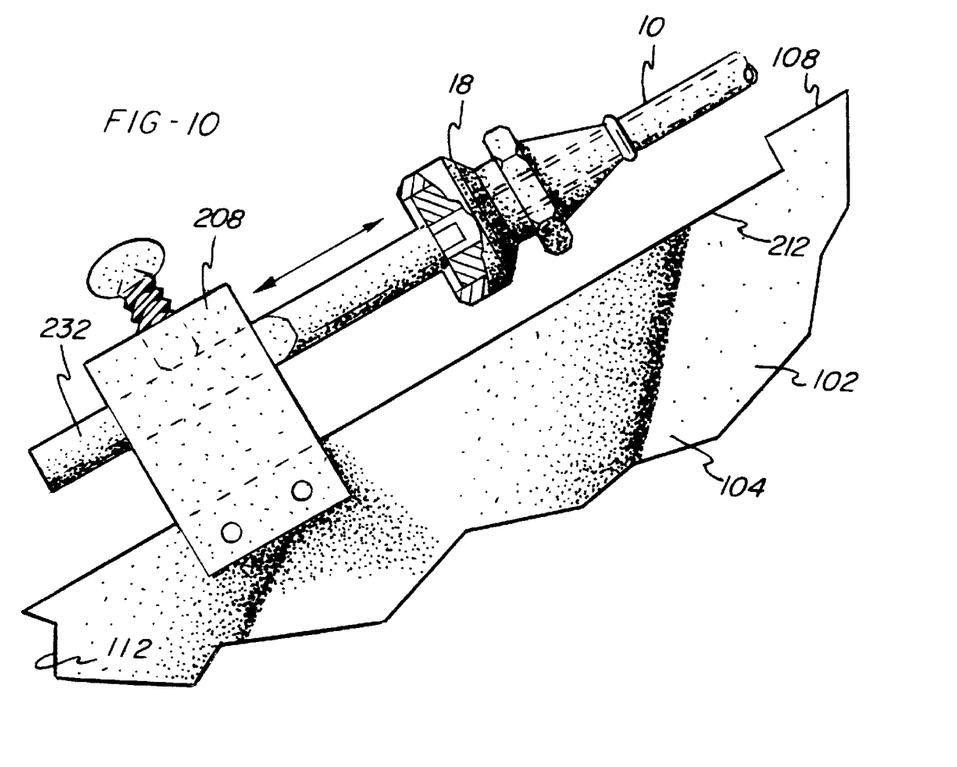
FIG. 10 is an enlarged sectional view of a head block mounted on a tube run of the fixture of FIG. 5.

The first and second tube runs 102, 120 each have a plurality of notches 200 in their top edges or tracks for holding yokes 202 (FIG. 11) or other suitable tube mounting mechanisms such as clamps or mounting plates. The first tube run 102, the third tube run 122, and the fourth tube run 124 also include notches 204 and holes 206 for mounting head blocks 208 (FIG. 10). The first tube run 102 includes additional notches 210, 212, 214, cut into the top edge or track 108 for accommodating mounting brackets, couplings, T-connectors, and nuts, of the tube to be inspected respectively. Additional notches may be cut as necessary to accommodate other hardware associated with the bent tubular part 10. The first tube run 102 also includes an arrow 220 located adjacent the top edge or track 108 for delineating a marking location and direction for a part number on the bent tubular part 10.

The bottom edges of the first tube run 102, the second tube run 120, the third tube run 122, the fourth tube run 124, the first support gusset 126, and the second support gusset 128, each include tabs 222 for fitting into corresponding windows or slots 224 on the base plate 130. In addition, the bottom edge 110 of the first tube run 102 includes half rounds 226 centered on bend areas 228 for relieving bend distortion and serving as guide stops for a bending apparatus (not shown).

Figure 11:
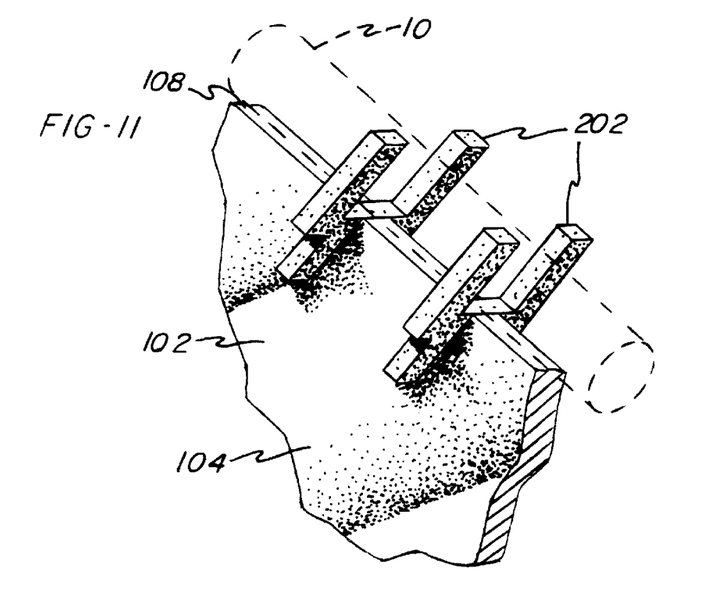
FIG. 11 is an enlarged sectional view of a pair of yokes mounted on a tube run track of the inspection fixture of FIG. 5.

It may be seen in FIG. 11 that the yokes 202 have an essentially H-shaped cross section. The length of the yoke 202 corresponds to the length between undivided notches 200 that are anchored along the length of the track in pairs. The distance between the upright legs of the yokes (i.e., the yoke width) corresponds to the size of the tolerance zone within which a tubular portion of the bent tubular part 10 must fit. The height of the crossbar of the yokes 202 is such that when the yokes 202 are fitted into the notches 200, the top of the crossbar is substantially flush with the tracks in the tube runs 102, 120.

The tube runs 102, 120, 122, 124, support gussets 126, 128, base plate 130, and yokes 202 are formed from a planar sheet-like material, such as, for example, stainless steel or aluminum. However, any suitable material may be used. One of the advantageous aspects of the invention is that sheet like metals are used to form the tube runs. This contrasts to the prior art methods in which thick bar stocks were cut and machined in order to form suitable fixtures.

The head blocks 208 (see FIG. 10) may be formed of rectangular blocks of material such as, steel or aluminum. The head blocks 208 have a cylindrical bore running longitudinally therethrough. Mounted within the longitudinal bore of each head block is a head pin 232 for locating one of the respective ends of the bent tubular part 10. Each head block 208 also has a groove formed longitudinally along its bottom. The thickness of the groove is slightly greater than the thickness of the tube run 102, 122, 124. The depth of the groove is such that when the head blocks 208 are mounted on the tracks of the tube runs 102, 122, 124, screws, pins, rivets, or other attachment means may be inserted through the head blocks and the corresponding holes 206 on the tube run. Alternatively, the head blocks 208 may be attached to the tube run 102, 122, 124 by welding or brazing.

A method of making the tube inspection fixture 100 for determining the accuracy of the bent tubular part 10 may comprise the steps of creating a first flat pattern for making a first tube run, creating a second flat pattern for making a base plate, forming the first tube run from a sheet material according to the first flat pattern, forming the base plate from the sheet material according to the second flat pattern, bending the tube run such that a top edge of the tube run forms a track that defines a profile adapted for determining whether the bent tubular part conforms to predetermined dimensional tolerances, and attaching the first bent tube run to the base plate.

Expanding upon the method of the invention, X, Y, and Z coordinates denoting end points, intersection points, location points and other points of interest of the bent tubular part 10 are first acquired. These points and their corresponding X, Y, Z locational data contain the necessary conformational information of the bent tubular part necessary to provide an accurate 3D image or picture of the bent tubular part. Collectively all of these points are referred to as conformational information points. These conformational information points and underlying X, Y, Z data may be obtained from a drawing print or from electronic data imported from a data file, if available. The X, Y, and Z coordinates for each of the conformational information points are entered into a CAD system. A suitable CAD system for such use is a general purpose computer running ProEngineer CAD software within a Windows NT operating system.

Once the X, Y, Z coordinates of all of the conformational information points of the bent tubular part 10 have been entered into the CAD system, an optimum orientation for the tubular part 10 in three-dimensional space is determined. A centerline is then constructed through the points defined by the X, Y, Z coordinates in the X-Y plane at an appropriate distance above the points from the Z axis. Effectively, a centerline constructed through the intersection points of the bent tubular part 10 is projected in the Z direction onto an X-Y plane. The X-Y plane onto which the centerline is projected is a predetermined minimum distance in the Z direction from the nearest point of the bent tubular part 10.

Next, a width is applied to the projection of the centerline on the X-Y plane. Usually, the width of the centerline is made to be substantially equal to the thickness of a sheet material from which the fixture is to be formed, or about 0.125" (3.175 mm) to 0.250" (6.35 mm) wide. The widened centerline projection is then extruded or swept in the Z direction a distance sufficient to include the intersection points of the centerline of the bent tubular part 10 in three-dimensional space.

Figure 12:
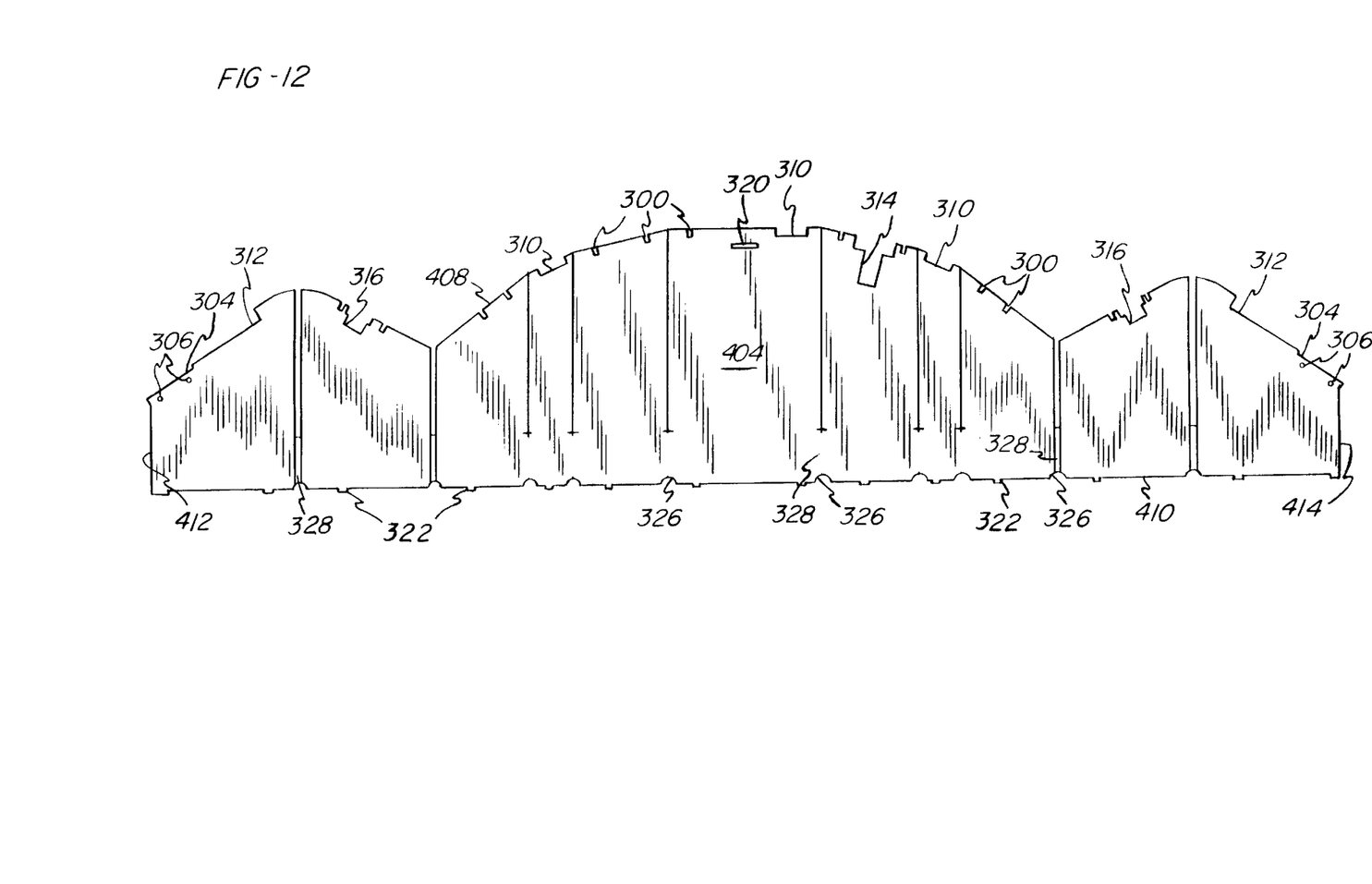
FIG. 12 is a front elevational view of a flat pattern in accordance with which a first tube run is to be formed.

As shown in FIG. 12, the resulting image or extrusion has the appearance of a plurality of planar sheet-like segments or portions joined together at their edges in end-to-end relationship. The planar segments form surface intersections or bend areas 328 at their joined edges, thereby defining bend angles between them. The top edge 408 of the joined planar segments conforms to the profile of the centerline of the first tube run 102.

Bend radius information is then added to the surface intersections of adjoining planar segments of the image or extrusion. Also, bend allowance factors are added to the surface intersections to account for stretching of the sheet material from which the tube run is to be made. The image or extrusion is then unfolded or flattened to form a flat pattern 800 (FIG. 12) for formation of the first tube run. This pattern will exist, for example, as an image available for view in connection with CAD software and a computer as previously discussed, or the image could be fixed in a tangible medium such as in a drawing. All such means of depicting the necessary conformational X, Y, Z data for the manufactured tubular part are referred to herein as a pattern.

Next, material is removed or cut away from the pattern at the bend areas 328 and from the top edge 408 of the flattened pattern to a depth just above the bottom edge 410 of the flat pattern 800. The depth is typically 0.5" (12.7 mm) to 1" (25.4 mm). Tabs 322 are then created along the bottom edge 410 of the flat pattern 800. The tabs 322 may be made by either removing material from the flat pattern 800 between the tabs 322, or by adding material to the bottom edge 410 of the flat pattern 800 at the tab sites. Half round areas 326 centered on the bend areas 328 are removed from the bottom edge 410 of the flat pattern 800.

The flat pattern 800 is then folded back to its original shape. Material equal to one-half of the diameter of the bent tubular part 10 is then removed from along the top edge 408 of the pattern. When finished, the top edge 408 of the pattern will correspond to track 108 (see FIG. 6) that defines a surface upon which the bent tubular part 10 will rest. Material is then removed from the ends 412, 414 of the extrusion to allow for fitting clearance and the mounting of head blocks 208.

The head blocks 208 and associated head pins or plungers 232 lock the bent tubular part 10 on the fixture 100 and are located at the ends of the tube runs 102, 120, 122, 124. (For example head blocks may be mounted on the apertures 206, 206 shown at the right and left hand extremities of tub run 102 shown in FIG. 5). In addition to determining the accuracy of dimensional tolerances of the bent tubular part 10, the fixture 100 may also be used to hold the various parts of the bent tubular part 10 in the correct interrelationship for welding or brazing.

Next, material is removed from the top edge 408 of the extrusion to facilitate placement of nuts 24 for welding. The nuts 24 must be capable of being slid axially along the tubular part 10. The resulting notches 316 allow the nuts 24 to be "parked" on a portion of the bent tubular part 10 remote from a welding site.

Then, material is removed from the top edge 408 of the extrusion in areas adjacent to wear sleeves (if any) on the tubular part 10. The material removed will usually be 0.03" (0.762 mm) wider and 0.1" (2.54 mm) deeper than the wear sleeve. The wear sleeves reduce frictional forces acting on the tubular part when it is installed in its intended application.

Once the desired pattern has been formed, a sheet of rigid material such as metal is cut to match the precise dimensions shown in the pattern to form the tube run. In most cases, the tube run, after cutting and light machining if necessary, will dimensionally correspond identically or substantially similar to its corresponding pattern.

Figure 19:
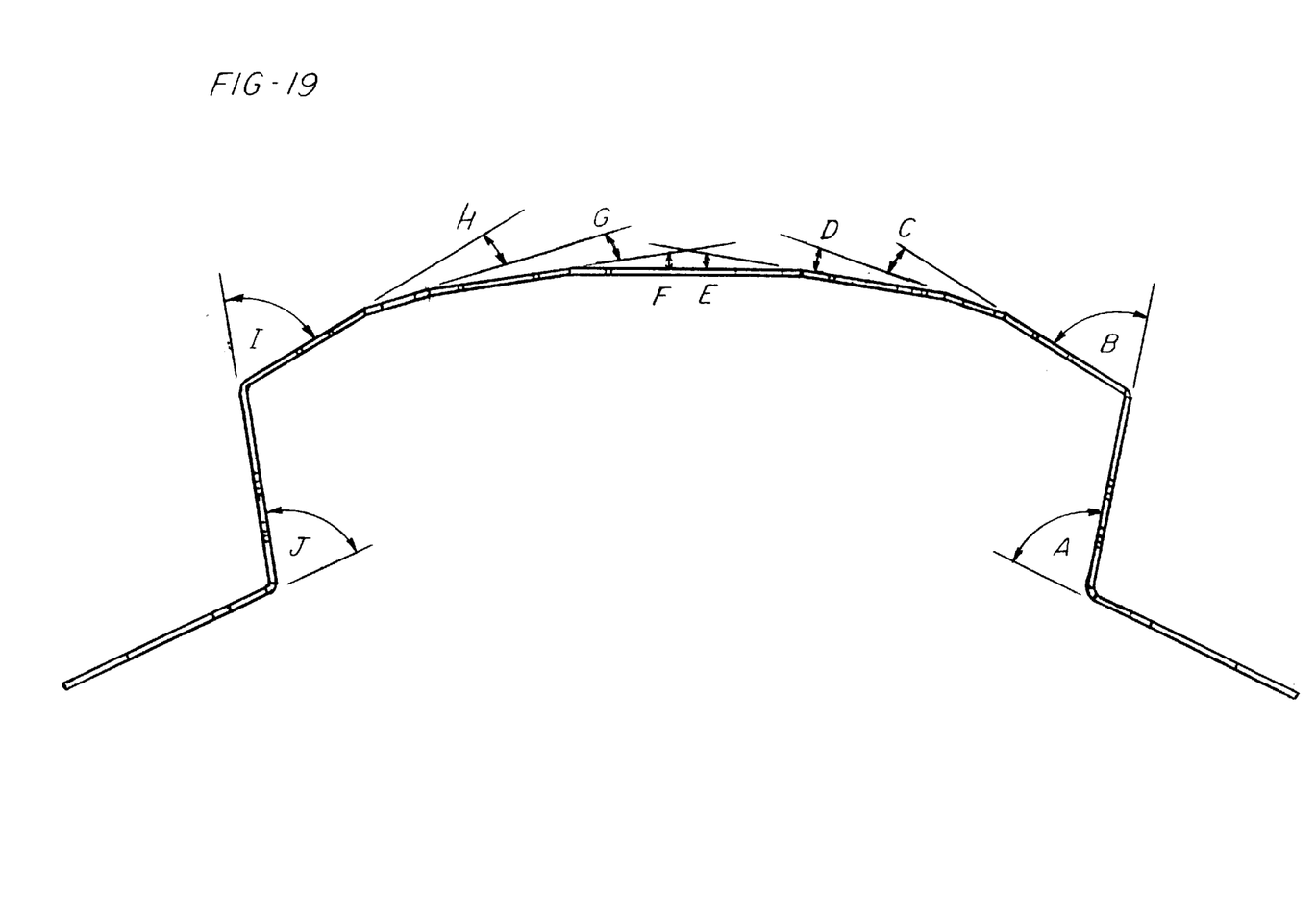
FIG. 19 is a drawing showing bend angle information for bending the first tube run of the inspection fixture of FIG. 5.

As previously indicated, the first tube run will correspond to the desired Z dimensions of the bent tubular part to be inspected. Stated differently, the height of the track 108 at any point along the length of the tub run will represent the Z directional coordinates of an accurately made bent tube. The base plate, fashioned after a second pattern, will correspond to the X and Y dimensions of the part and will serve as a base upon which the first tube run will be mounted via tabs or other mounting mechanisms. The first tube will be bent at a plurality of bend points so that its shape, when viewed in plan, will also correspond to the X, Y dimensions of the part. A bending diagram may be generated as shown in FIG. 19 so that the first tube run, and others if necessary, will be bent correctly via a manual or PLC controlled bending machines. After this bending operation, the track will not only represent the Z directional coordinates but also the X and Y coordinates of the part.

Flat tube runs are bent in accordance with the angle dimensions A–J on the drawing print (FIG. 19). For example, at location A, the tube run will be bent as at the angle A. The bending operation may be done on a conventional, manually controlled press brake or on a computer controlled bending machine. Suitable bending machines are shown, for example, in U.S. Pat. Nos. 5,537, 895 (Young et al.); 4,773,284 (Ancher et al.); and 5,488,470 (Ooenoki). The disclosures of these patents are incorporated by reference.

The bent tube runs 102, 120, 122, 124 are then fitted to the base plate 130 and welded into place. During the welding process, the tube runs 102, 120, 122, 124 must be maintained in a perpendicular orientation with respect to the base plate 130. The support gussets 126, 128 are added to the fixture and welded in place for stiffness. The yokes 202 are then welded or otherwise secured into their respective notches 200. The entire fixture 100 may then be mounted on a base plate support material, such as wood, if desired. The head blocks 208 with head pins 232 are then installed on the ends of the tube run 102, 120, 122, 124. Finally, the finished inspection fixture 100 is inspected to determine that it has been made in accordance with specifications.

Figure 13:
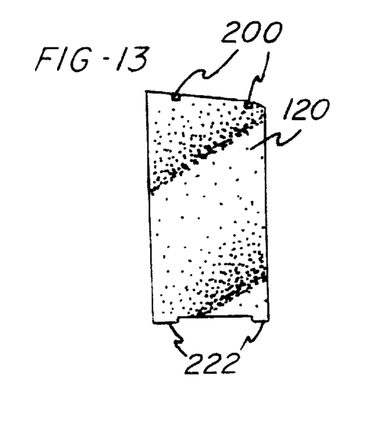
FIGS. 13 through 15 are auxiliary or secondary tube runs made in accordance with the method of the invention.
Figure 14:
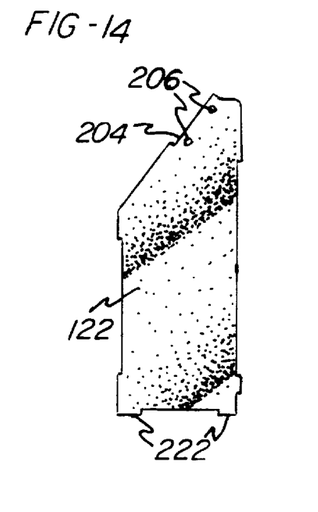
Figure 15:
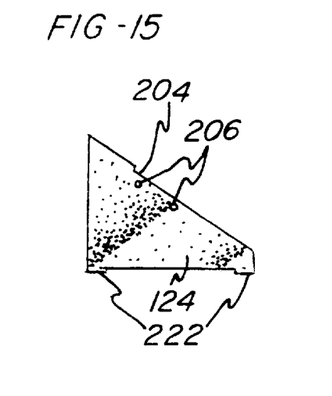

The above steps may be repeated as necessary to produce additional tube runs (FIGS. 13–15) to accommodate branched tubular part assemblies.

An arrow feature 220 (see FIG. 7) is cut in the appropriate tube run 102 to delineate a marking location and direction for indicia to be printed on the tubular part 10. Notches 200 are then cut into the top edge or track 108 of the tube run to accommodate yokes 202. The yokes 202 fit or plug into the notches 200 and define the tolerance zone into which the tubular part 10 must fit. A base plate 130 (FIG. 16) to which the tube runs 102, 120, 122, 124 are to be mounted is then created.

Figure 16:
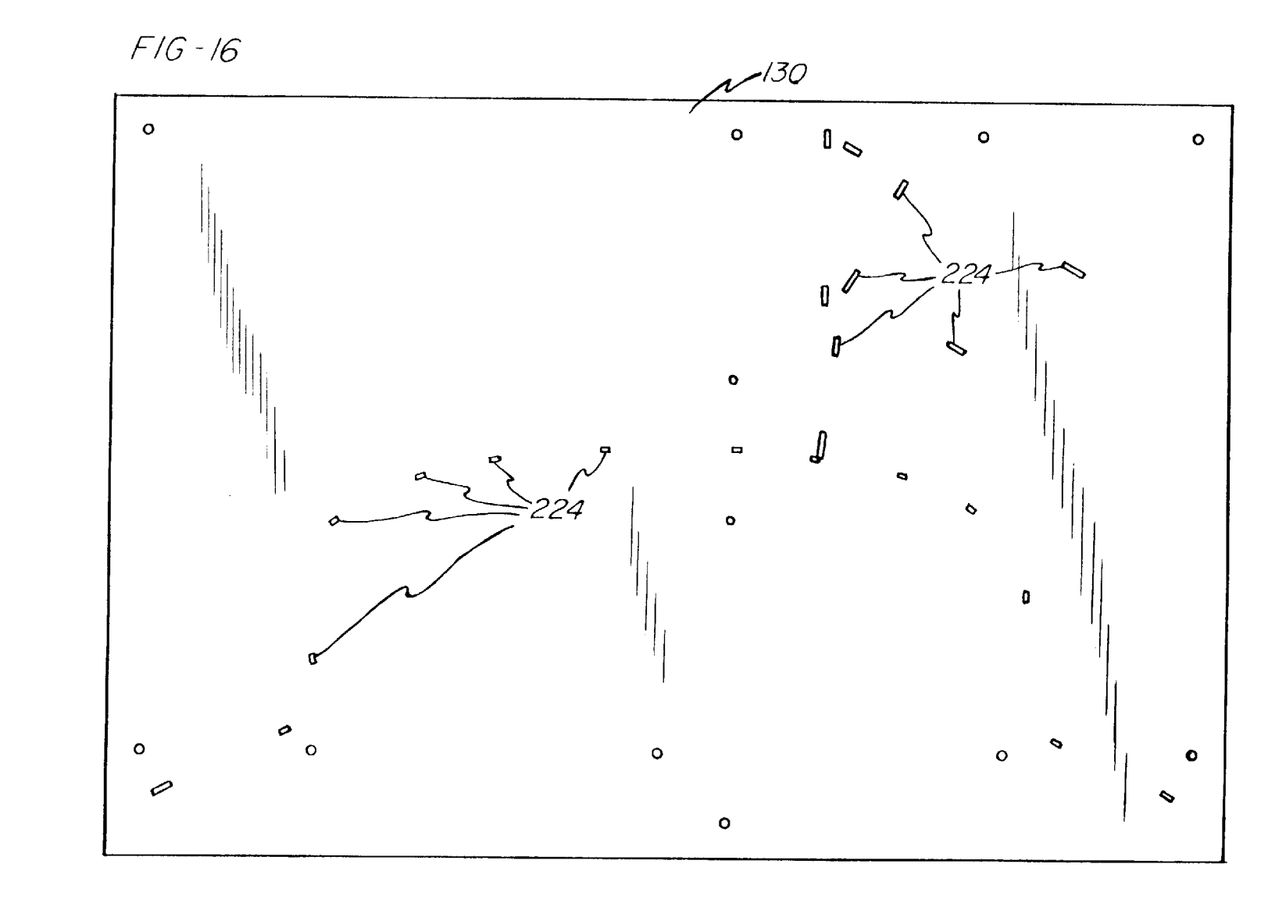
FIG. 16 is a top plan view of a base plate of the fixture of FIG. 5.
Figure 17:
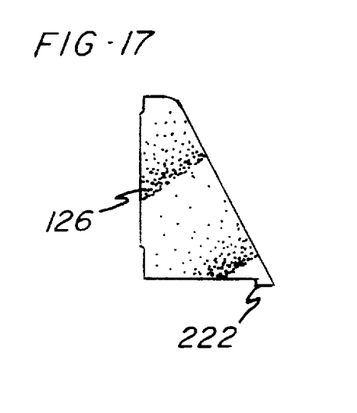
FIGS. 17 and 18 are front elevational views of gussets of the inspection fixture made in accordance with the method of the invention.
Figure 18:
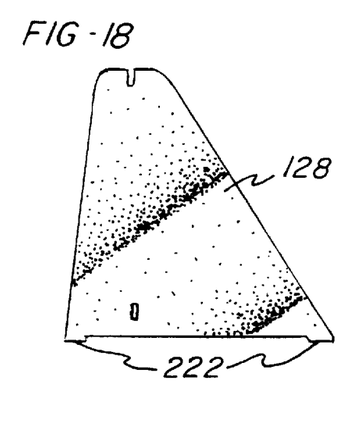

All of the tube runs 102, 120, 122, 124 are assembled in three-dimensional space. The assembled parts are aligned with-the base plate 130 and windows or slots 224 corresponding to the tube run tabs 222 are cut into the base plate 130 (FIG. 16). Then, any required support gussets 126, 128 (FIGS. 17, 18) are created. The support gussets 126, 128 provide additional support for the tube run 102, 120, 122, 124 and make the entire inspection fixture 100 stronger. Any special mounting for brackets or other items of interest are then created.

Holes in the base plate may be cut for hold-down screws. More holes may be cut in the base plate for coordinate measuring machine set up. Additional information such as the tubular part number, rotation, and Z-axis zero information may be formed in the base plate at this time. Any holes in the parts are reamed, if necessary, and the parts are deburred or tumbled, as necessary.

It is thereby apparent that the method of the instant invention pertains generally to a method of making an inspection fixture for determining the conformational accuracy of a tubular part. The tubular part has a plurality of X, Y and Z coordinates located along its length. These coordinates provide the proper conformational information so that one may reconstruct the desired bent tube conformation through plotting and assembly of the plotted X, Y, Z coordinates. Together, all of these coordinates define the true three dimensional structure for the bent tubular part.

A first pattern is generated having a top contour portion thereof. The top contour portion is contoured so that its height is correlated to the Z direction of the conformational information points. This first pattern is used, or copied, so as to help in the formation of a tube run from a sheet of rigid material such as plastic or metal, preferably stainless steel. The tube run has a top edge portion or track having a height that is correlated or related to the Z direction of the conformational information points.

Preferably, the tube run is formed via a laser cutting operation in which the laser cutter is controlled via CAD-CAM input to a PLC or the like. The PLC controls the laser cutting head, thereby forming the desired tube run, which tube run is identical to or substantially similar, in dimensions, to the first pattern. Computer controlled laser operation is disclosed for example in U.S. Pat. No. 5,614,115 (Horton et al.). This patent is incorporated by reference herein.

After the tube run is made, it is forwarded to a manual or computer actuated bending station. The tube run is then bent at desired points along its length and in the desired angular displacement so that the top edge of the tube run or track then corresponds or contains a contour which is correlated to not only the Z directional information taken from the bent tube but also the X and Y dimensional directions from the bent tube. The track of the tube run is thereby made in such fashion that it is adapted for congruent reception thereon of an accurately bent tubular part. The operator merely places the manufactured bent tubular part on the track of the inspection figure and visually assesses whether or not the part has been made correctly.

Additionally, a second flat pattern may be made by using the X, Y coordinates of the bent tubular part. The second pattern is then used so as to facilitate cutting or other formation of a base plate. The base plate is preferably composed of sheet metal, and includes locator holes or the like which are adapted for mounting receipt of tabs or the like formed in the tube run. The tube run is then mounted to the base plate via the tabs and apertures, or other suitable locator means, and the base plate and tube run assembly form the inspection fixture.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. A method of making an inspection fixture for determining the conformational accuracy of a tubular part having X, Y, and Z directional conformational information points along its length which, together define a correct three dimensional structure for said part; said method comprising the steps of:
    (a) forming a first pattern having a top contour thereof with a first set of dimensions correlated to the Z direction of said conformational information points;
    (b) forming a tube run from a sheet of rigid material, said tube run having a top edge portion that substantially matches said first set of dimensions;
    (c) bending said tube run at desired locations along its length and in desired angular displacements so that said top edge portion of said tube run also contains a second set of dimensions correlated to the X and Y direction of said conformational information points and is thereby adapted for congruent reception of an accurately made tubular part therein.

2. A method as recited in claim 1 wherein said step of forming comprises transmitting X, Y, and Z coordinates for said conformational information to a computer, and cutting said tube run by a laser cutter controlled by said computer.

3. A method as recited in claim 1 wherein said sheet of rigid material comprises stainless steel.

4. A method as recited in claim 1 further comprising making a base plate and mounting said tube run on said base plate.

5. A method of making an inspection fixture for determining the conformational accuracy of a bent tubular part, said method comprising the steps of:
   (a) creating a first flat pattern;
   (b) cutting a tube run from a sheet material said tube run substantially corresponding to said first flat pattern in dimensional detail;
   (c) bending said tube run such that a top edge thereof defines a profile adapted for superpositioning of a bent tubular part thereon to thereby assess whether said part conforms to predetermined dimensional tolerances;
   (d) providing a base; and
   (e) mounting said bent tube run on said base.

6. A method according to claim 5 wherein said step of providing a base comprises:
   (d)(1) creating a second flat pattern for making a base plate, and
   (d)(2) cutting said base plate from said sheet material according to said second flat pattern.

7. A method according to claim 5 wherein said step of creating a first flat pattern comprises:

(a)(1) providing the X, Y, and Z coordinates of conformational information points of said bent tubular part to a CAD system,
   (a)(2) constructing a centerline through said intersection points,
   (a)(3) positioning said centerline for orientation in three-dimensional space,
   (a)(4) projecting said centerline onto an X-Y plane to form a centerline projection,
   (a)(5) thickening said centerline projection to a width substantially equal to that of said sheet material to form a centerline area,
   (a)(6) extruding said centerline area from said X-Y plane to said centerline to form an extrusion having a top edge defined by said centerline, and
   (a)(7) removing portions of said top edge as needed to accommodate the profile of said bent tubular part.

* * * * *